United States Patent Office 3,775,504
Patented Nov. 27, 1973

3,775,504
PRODUCTION OF BENZENE
Roy John Sampson, Christopher Buxton Spencer, and Satish Chandra Nirula, Stockton-on-Tees, England, assignors to Imperial Chemical Industries Limited, London, England
No Drawing. Filed Apr. 21, 1972, Ser. No. 246,436
Claims priority, application Great Britain, May 7, 1971, 13,719/71
Int. Cl. C07c 3/58
U.S. Cl. 260—672 R     14 Claims

ABSTRACT OF THE DISCLOSURE

Alkyl aromatic hydrocarbons, for example, toluene, are dealkylated to yield benzene and hydrogen in the presence of steam and, optionally, hydrogen over a Group VIII noble metal catalyst supported on alpha-alumina. The hydrogen generated is used to supply at least part of the hydrogen requirement for a hydrodealkylation process, optionally carried out simultaneously with the steam dealkylation process in a common reactor.

---

This invention relates to the conversion of alkyl benzenes to benzene and hydrogen.

In our co-pending application Ser. No. 104,162 we have described a continuous process for dealkylating alkyl benzenes such as toluene and $C_9$ aromatic hydrocarbons consisting in passing one or more alkyl benzenes, together with steam preferably in substantial molar excess, in the vapour phase over a solid dealkylation catalyst that contains an active metal component consisting of at least one supported Group VIII noble metal and a support component consisting essentially of alumina, effecting a phase separation upon the reaction product whereby to isolate an organic fraction containing benzene and unchanged and/or other aromatic hydrocarbons, separating benzene from the organic fraction and recycling such unchanged and/or other aromatic hydrocarbons as feed material for continued dealkylation.

The major co-product of the process of our co-pending application is hydrogen. We have now found that the steam dealkylation process of our co-pending application can be carried out in combination with a hydrodealkylation process for which the hydrogen requirement is supplied, at least in part, by the steam dealkylation process of our co-pending application.

It is preferred to carry out the steam dealkylation and the hydrodealkylation simultaneously in a common reactor using a common catalyst which comprises a Group VIII noble metal supported on alumina. It is preferred to use platinum as the Group VIII noble metal but iridium, palladium, rhodium and ruthenium may also be used. The support component preferably consists essentially of alumina containing at least 50% of alpha-alumina, expressed as a percentage of the total alumina present.

The support may contain also other forms of alumina or alumina-containing material such as zeolite or a spinel and also silica, but preferably there is at least 70% of alpha-alumina present expressed as a percentage of the total support. The presence of silica, is however, considered undesirable although it may perhaps be readily tolerated in small proportion possibly even up to about 5% by weight of the support. A small proportion of alkaline material may be present in order to reduce the intrinsic acidity of the support. Alkali metal and alkaline earth metal oxides are preferred alkalising materials. The presence of the minor proportions of other oxidic species may in practice be unavoidable.

Outstanding amongst the Group VIII noble metals are iridium, rhodium and platinum, each of which combines sufficiently great activity for attractiveness in commercial operation with very high selectivity for benzene production. Palladium and ruthenium for example, demonstrate lower selectivities than platinum and iridium. The content of noble metal impregnated on the catalyst is suitably from 0.1 to 1% by weight, for example 0.4 to 0.8% by weight, but contents above and below this range may be used if desired. Catalyst regeneration may be accomplished in known manner using an atmosphere which contains one or more of hydrogen, steam, oxygen or oxygen-containing gas such as air.

The process of the invention may be operated by effecting steam dealkylation in one part of the catalyst bed and hydrodealkylation in another part of the catalyst bed. Alternatively, steam dealkylation and hydrodealkylation may be carried out alternately in several successive sections of the catalyst bed. The feed of dealkylatable aromatic hydrocarbon may be fed to the process at only one point of the catalyst bed or at several points along the bed simultaneously.

If desired, some hydrogen may be fed to the bed from an external source to ensure that hydrogen is present over the whole of the catalyst bed. This ensures that hydrodealkylation can occur as well as steam dealkylation at all points of the catalyst bed. Moreover catalyst deactivation, which may occur in those parts of the catalyst bed in which hydrogen is not present continuously is reduced. If hydrogen is fed to the process from an external source it may be fed separately from or together with the supply of steam. Alternatively, hydrogen issuing as effluent from the process of the invention may be recycled to the catalyst bed.

It is preferred that the amounts of reactants fed to the process should be such that the molar ratio of hydrogen:steam:aromatic hydrocarbon is in the ranges 5:1 to 20:1, more preferably in the range 8:1 to 14:1. The molar ratio of steam to hydrogen preferably lies in the range 10:1 to 1:4, more preferably 7:1 to 2:1.

The reactants are desirably preheated to a temperature at least approaching reaction temperature. The reaction temperatures may very suitably be maintained within the range of from 400° to 800° C. The preferred operating range of temperature is 550° to 700° C.

The reaction proceeds at any practical pressure but for reasons of operating convenience it is preferred to use above atmospheric pressure. Very likely, optimum pressures for commercial production will be found to lie within the range of from 5 to 50 atmospheres gauge, more preferably 25 to 50 atmospheres.

Weight hourly space velocities (WHSV) for the feed aromatic hydrocarbon(s) are suitably within the range of 0.2 to 10, preferably 0.2 to 2.

In the hereinbefore described form of the present invention, we have found that it is possible to control the process so that it operates near a hydrogen balance, i.e. under conditions where the hydrogen required for hydrodealkylation is supplied by the steam dealkylation. Moreover, in such conditions of hydrogen balance or near-balance, the heat required for the steam dealkylation is approximately balanced by the heat output of the hydrodealkylation.

In mixtures in which aliphatic hydrocarbons are present with the aromatic hydrocarbons the aliphatic hydrocarbons may undergo steam reforming of hydrocracking. In such a case these reactions must also be taken into account when operating conditions for achieving hydrogen and/or thermal balance in the process of the invention are determined.

Carbon dioxide is readily separated from the effluent gas phase by known processes, e.g. processes based upon the formation and decomposition of potassium bicarbonate. If carbon monoxide removal is also desired, this may be achieved in known manner, by, say, a water-gas shift process.

Phase separation of the condensable portion of the effluent from the dealkylation reaction is likewise readily accomplished in known manner. The top-stream of aromatic hydrocarbons withdrawn from the phase separation stage may be split (after appropriate drying) by distillation into a product benzene stream and a recycled alkyl aromatic(s) stream. This distillation may be effected in a column that is separate from distillation facilities forming part of any integrated or adjoining plant for aromatic hydrocarbon production or may be effected by such facilities.

A further form of the process of the invention comprises a process in which steam dealkylation and hydrodealkylation are carried out in separate reactors each supplied with a feed of dealkylatable alkyl aromatic hydrocarbons, the hydrogen for the hydrodealkylation being supplied, at least in part from the steam dealkylation. If desired, this hydrogen may be purified before being passed to the hydrodealkylation reactor by the removal of one or more of the contaminating gases which it may contain, for example, carbon monoxide, carbon dioxide. A portion of the hydrogen from the dealkylation reactor may also be recycled back to that reactor if desired, as described in the specification of our co-pending application. Any methane in this recycle hydrogen may be reformed in the steam dealkylation stage to carbon monoxide and hydrogen.

In this further form of the invention, the hydrodealkylation may be thermal or catalytic. If catalytic hydrodealkylation is used the same catalyst comprising a Group VIII noble metal on an alumina support as hereinbefore described may be used in both reactors. If desired, however, a conventional hydrodealkylation catalyst, for example chromia-alumina, may be used in the hydrodealkylation reactor.

Conservation of heat produced and reduction of heat required in this further form of the process of the invention may be achieved by enclosing the hydrodealkylation reactor within the steam dealkylation reactor or vice versa. For example, the steam dealkylation reactor may take the form of a series of tubes within a cylindrical hydrodealkylation reactor. At least part of the heat requirement for steam dealkylation can then be transferred from the hydrodealkylation reactor.

The following example illustrates the process of this invention.

Steam, hydrogen and toluene were charged at a pressure of 400 p.s.i.g. to a stainless steel tube containing as catalyst platinum (0.55% by weight) supported on alumina pellets of surface area 11 m.$^2$g.$^{-1}$. The alumina support, which was chiefly alpha-phase, was prepared by heating ICI Agricultural Division's 12–1-gamma-alumina in a stream of air in a muffle furnace for 17 hours at 1075° C. The toluene weight hourly velocity was 0.7 g./g. catalyst/hour, the toluene:steam:hydrogen molar ratios being 1:9:2. At a temperature of 650° the toluene conversion was 36%, the selectivity for benzene being 90%. The composition of the effluent gas stream was:

| | Volume percent |
|---|---|
| $H_2$ | 85 |
| CO | 0.8 |
| $CH_4$ | 9.2 |
| $CO_2$ | 5.5 |

Thus for each mole of toluene converted the net moles of gas produced were:

| | |
|---|---|
| $H_2$ | 0.54 |
| CO | 0.075 |
| $CH_4$ | 0.87 |
| $CO_2$ | 0.52 |

The net enthalpy per mole toluene converted was 2.3 kilocalories endothermic.

What is claimed is:

1. A continuous process for dealkylating alkyl benzenes which comprises passing one or more alkyl benzenes, together with steam, in the vapour phase over a solid dealkylation catalyst that contains an active metal component consisting of at least one supported Group VIII noble metal and a support component consisting essentially of alumina containing at least 50% of alpha-alumina expressed as a percentage of the total alumina present, effecting a phase separation upon the reaction products whereby to isolate an organic fraction containing benzene, unreacted alkyl benzenes, other aromatic hydrocarbons formed in the process or both, separating benzene from the organic fraction and recycling such unreacted alkyl benzenes, other aromatic hydrocarbons formed in the process or both as feed material for continued dealkylation, in combination with a hydrodealkylation process for dealkylating alkyl benzenes, at least part of the hydrogen requirement for the hydrodealkylation process being supplied by the steam dealkylation stage.

2. A process as claimed in claim 1 in which the steam dealkylation and the hydrodealkylation are carried out simultaneously in a common reactor using a common catalyst which comprises a Group VIII noble metal supported on alumina.

3. A process as claimed in claim 2 in which the alumina support consists essentially of alumina containing at least 50% of alpha-alumina, expressed as a percentage of the total alumina present.

4. A process as claimed in claim 2 in which steam dealkylation is effected in one part of the catalyst bed and hydrodealkylation is effected in another part of the catalyst bed.

5. A process as claimed in claim 2 in which steam dealkylation and hydrodealklation are carried out alternately in several successive sections of the catalyst bed.

6. A process as claimed in claim 1 in which the Group VIII noble metal is platinum, iridium, palladium, rhodium or ruthenium.

7. A process as claimed in claim 6 in which the content of noble metal impregnated on the catalyst is 0.1 to 1% by weight.

8. A process as claimed in claim 1 in which the molar ratio of steam+added hydrogen:aromatic hydrocarbon is in the range 5:1 to 20:1.

9. A process as claimed in claim 1 in which the molar ratio of steam to added hydrogen lies in the range 10:1 to 1:4.

10. A process as claimed in claim 1 in which steam dealkylation and hydrodealkylation are carried out in separate reactors each supplied with a feed of dealkylatable alkyl aromatic hydrocarbons, the hydrogen for the hydroalkylation being supplied, at least in part from the steam dealkylation.

11. A process as claimed in claim 10 in which hydrodealkylation is catalytic.

12. A process as claimed in claim 10 in which the same catalyst comprising a Group VIII noble metal on an alumina support is used in both reactors.

13. A process as claimed in claim 10 in which the hydrodealkylation reactor is enclosed within the steam dealkylation reactor or vice versa.

14. A process as claimed in claim 1 which comprises passing toluene together with steam and hydrogen in the vapour phase over a solid dealkylation catalyst selected from platinum on alumina, rhodium on alumina, and iridium on alumina, the alumina containing at least 90% of alpha-alumina, the molar ratio of steam+added hydrogen:aromatic hydrocarbon lying in the range 5:1 to 20:1, the molar ratio of steam to added hydrogen lying in the range 10:1 to 1:4, effecting a phase separation upon the reaction products whereby to isolated an organic fraciton containing benzene and toluene, separating benzene from the organic fraction, recycling unchanged toluene as feed material for continued dealkylation and effecting a hydrodealkylation upon toluene simultaneously and in a common reactor with the steam dealkylation.

References Cited
UNITED STATES PATENTS

| | | | |
|---|---|---|---|
| 3,151,175 | 9/1964 | Goldsmith | 260—672 R |
| 3,204,007 | 8/1965 | Mukai et al. | 260—672 R |
| 3,291,850 | 12/1966 | Carson | 260—672 R |

CURTIS R. DAVIS, Primary Examiner